United States Patent [19]
Yao et al.

[11] Patent Number: 6,021,464
[45] Date of Patent: Feb. 1, 2000

[54] REAL TIME DISK ARRAY WHICH GUARANTEES WRITE DEADLINES BY SELECTING AN ALTERNATE DISK

[75] Inventors: Hiroshi Yao; Tatsunori Kanai; Toshiki Kizu, all of Kanagawa-ken; Seiji Maeda, Tokyo; Osamu Torii, Kanagawa-ken, all of Japan

[73] Assignee: Kabushiki Kaisha Toshiba, Kawasaki, Japan

[21] Appl. No.: 08/927,015

[22] Filed: Sep. 10, 1997

[30] Foreign Application Priority Data

Sep. 13, 1996 [JP] Japan ................................ 8-243291

[51] Int. Cl.[7] .................................................. G06F 12/02
[52] U.S. Cl. .......................... 711/114; 711/113; 711/168; 348/7; 710/41
[58] Field of Search .................................. 711/113, 114, 711/168; 348/7

[56] References Cited

U.S. PATENT DOCUMENTS

| | | | |
|---|---|---|---|
| 5,544,313 | 8/1996 | Shachnai et al. | 395/200.49 |
| 5,583,995 | 12/1996 | Gardner et al. | 395/200.49 |
| 5,640,194 | 6/1997 | Suzuki et al. | 348/7 |
| 5,642,152 | 6/1997 | Douceur et al. | 348/7 |
| 5,646,676 | 7/1997 | Dewkett et al. | 348/7 |
| 5,752,256 | 5/1998 | Fujii et al. | 711/114 |
| 5,787,482 | 7/1998 | Chen et al. | 711/158 |
| 5,890,202 | 3/1999 | Tanaka | 711/111 |

OTHER PUBLICATIONS

Hideki Sakamoto et al., "Video Server Architecture Supporting Real-Time Input and Immediate Playback", Proceedings of the Multimedia Japan 1996, pp. 224–231.

*Primary Examiner*—John W. Cabeca
*Assistant Examiner*—Christopher S. Chow
*Attorney, Agent, or Firm*—Finnegan, Henderson, Farabow, Garrett & Dunner, L.L.P.

[57] ABSTRACT

The system and method store data into disk devices without loss of data, even when write requests having time limits are concentrated on a specific disk. When a write request for a given disk device is issued, if it is determined that some of this write request and other access requests having time limits for this disk device would not be executed within the respective time limits, the system writes the data temporarily into another disk device.

23 Claims, 5 Drawing Sheets

REAL TIME DISK ARRAY WHICH GUARANTEES WRITE DEADLINES BY SELECTING AN ALTERNATE DISK

BACKGROUND OF THE INVENTION

The present invention relates to a system and method for scheduling access requests to disk devices where the access requests include data write requests with time limits.

Generally, a real-time system handling jobs with time limits determines a processing order such that the plurality of jobs can be processed within their respective time limits. Real-time scheduling may be applied to process disk accesses in such real-time systems. Examples of such systems are a video server in which video data stored on a disk are continuously transferred to a client, a plant condition monitoring/recording system, and so on. In such a system, a plurality of disk devices are usually provided to realize sufficient transfer capability for a data storage device.

Also, to handle periodically-generated jobs with time limits, a system decides whether a new job can be accepted for processing based on the processing capability of the whole system, the periods with which respective jobs are generated, the job processing time, and the required resources. This decision is called "admission control", and the decision standard is made in accordance with the type of scheduling or system.

In some cases however, even though a job has been admitted by the admission control, it may not in fact be possible to guarantee that all jobs are completed within their respective time limits because the periods with which respective jobs are generated may vary due to some external factor.

For example, in the case of a video server, when video data is obtained by directly encoding the output of a video camera and transmitted to the video server through a network to be stored on the disk device in the video server, the periods at which disk access requests are issued may fluctuate due to jitter in the arrival time caused by network delay. When this happens, more than the anticipated requests are concentrated on a specific disk device at a given time. As a result, it may be impossible to execute all the disk access requests within their time limits no matter how the schedule is re-arranged. In the example, the video data arriving through the network as described above cannot be stored on the disk device and is lost.

To solve this problem, a conventional system provides a larger buffer memory to hold the data to be written, which extends the data holding time so as to make the time limit of a write request longer. However, if, for example, segments of a stream are sequentially stored on N disk devices assuming that the access period is T, it is necessary to wait for a time N×T for a next free time slot in the worst case. To hold the data in the buffer for this time, it is necessary to provide a buffer corresponding to (N+1) segments. Thus, such a conventional approach suffers disadvantages.

SUMMARY OF THE INVENTION

It is therefore an object of the present invention to provide a mechanism for storing data into disk devices without loss of data, even when write requests having time limits are concentrated on a specific disk device, yet without increasing the buffer memory to extend the time limit for writing.

According to one aspect of the present invention, there is provided a data storage device, including a plurality of disk devices, a module for storing a plurality of access requests for each of the plurality of disk devices, a module for receiving a write request having a time limit, a module for selecting one of the plurality of disk devices for the write request if it is determined that all of the access requests having time limits for the selected disk device and the write request can be executed within the respective time limits on the selected disk device, and a module for scheduling the plurality of access requests for the selected disk device and the write request and instructing the selected disk device to execute the scheduled access requests and write request.

According to another aspect of the present invention, there is provided a method of controlling a data storage device having a plurality of disk devices, including the steps of storing a plurality of access requests for each of the plurality of disk devices, receiving a write request having a time limit, selecting one of the plurality of disk devices for the write request so that all of the access requests having time limits for the selected disk device and the write request are executed within the respective time limits on the selected disk device, and scheduling the plurality of access requests for the selected disk device and the write request, to instruct the selected disk device to execute the scheduled access requests and write request.

Other features and advantages of the present invention will become apparent from the following description taken in conjunction with the accompanying drawings.

Both the foregoing general description and the following detailed description provide examples consistent with this invention and explain how to make and use systems and methods consistent with the invention. These descriptions do not restrict the claimed invention.

BRIEF DESCRIPTION OF THE DRAWINGS

FIG. 5 (a) shows a time chart of disk access in a video server according to an embodiment of the present invention;

FIG. 5 (b) shows a time chart of buffer use when sending streams in a video server according to an embodiment of the present invention; and FIG. 5 (c) shows a time chart of buffer use when receiving streams in a video server according to an embodiment of the present invention.

DETAILED DESCRIPTION OF THE PREFERRED EMBODIMENTS

In this embodiment, according to the present invention, when a write request for a given disk device is issued, if this write request cannot be completed before the arrival of the next data, the system writes the data temporarily into another disk device. In this way, the system creates free buffer memory space within a shortened time so that data for the following write request can be received in the buffer memory. Subsequently, when the necessary system resources are not busy, the data is moved to the disk device for which it was intended.

Figure 1:
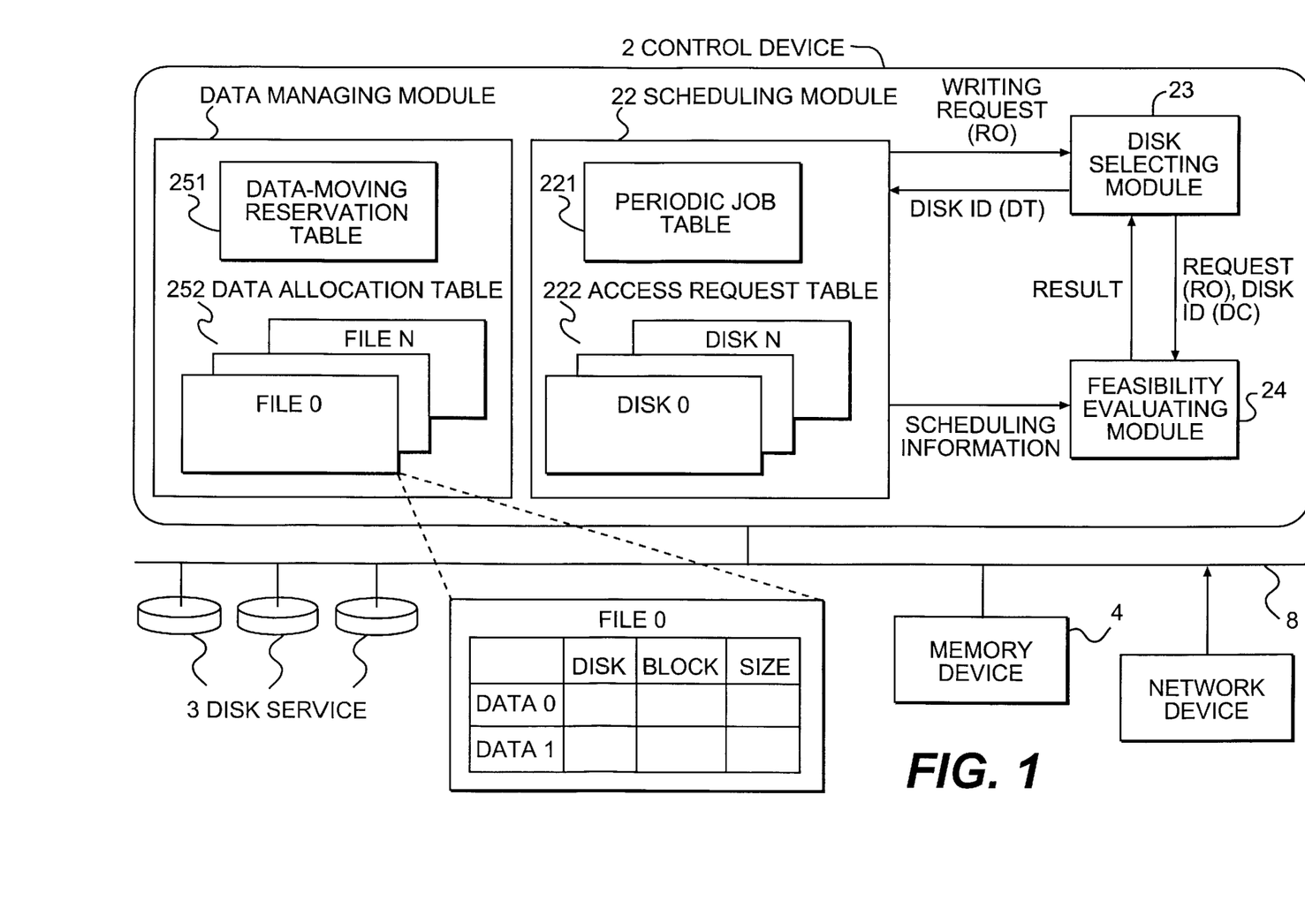
FIG. 1 shows an exemplary configuration of a data storage device according to an embodiment of the present invention.

FIG. 1 shows an exemplary configuration of a data storage device according to one embodiment of the present invention. The data storage device of this embodiment generally comprises control device 2, disk devices 3, and memory device 4.

Control device 2 comprises scheduling module 22, write disk device selecting module 23, scheduling feasibility evaluating module 24, and data managing module 25. Scheduling module 22 comprises periodic job table 221 and access request table 222. Data managing module 25 comprises data-moving reservation table 251 and data allocation table 252. Hereinafter, write disk device selecting module 23 will be referred to as the selecting module, and scheduling feasibility evaluating module 24 will be called the evaluating module.

Disk device 3 is used for storing data. Disk device 3 incorporates a controller for performing reading or writing of data specified in accordance with an access instruction issued from scheduling module 22 of control device 2.

Memory device 4 is used as a buffer for temporarily holding data to be written to disk device 3 or data read from disk device 3. Memory device 4 may be either a single memory or a memory group including a plurality of memories.

The plurality of disk devices 3 and memory device 4 are connected by a data transfer line 8, such as a SCSI bus, so that the data stored in memory device 4 can be written to any disk device 3. Also, when data is transferred between this data storage device and a device connected via a network, a network input/output device (not shown in the figure) is connected to bus 8.

Control device 2 also includes evaluating module 24, selecting module 23, and scheduling module 22. To implement these modules, corresponding software may be incorporated into the Operating System ("OS") or they may be operated as a user program. Alternatively, a separate control device, such as a computer having a CPU different from the CPU that runs the OS and application software, may be provided to operate the evaluating module 24, selecting module 23, and scheduling module 22 software. Alternatively, evaluating module 24, selecting module 23 and scheduling module 22 may be implemented as hardware circuitry.

Scheduling module 22 accepts access requests, schedules access instructions, registers periodic jobs, and issues access instructions. For example, scheduling module 22 may accept access requests at arbitrary times, while it performs scheduling, periodic job registration, and access instruction issue, periodically. An access request may be either a non-periodically issued access request or an individual access request constituting a registered periodic job. A periodic job is a series of access requests to be issued periodically. An access request for data reallocation between disk devices, to be described later, constitutes a nonperiodic job and does not have a time limit.

An access request may be issued from outside scheduling module 22 (for example, from a user program) or from within scheduling module 22 itself. For example, in a case of a periodic job for which scheduling module 22 itself is a master of time, scheduling module 22 itself may issue individual access requests.

Scheduling module 22 includes management table 222 for access requests currently issued with respect to disk devices 3, and management table 221 for periodic jobs. Management table 221 is used for managing the anticipated period and data size of each periodic job and, if necessary, is used for controlling the storing order for the plurality of disk devices 3. The time required to complete one processing cycle of a job is determined based on the anticipated period and data size managed as above.

Since the information of management tables 221 and 222 is also required for evaluating module 24, if necessary, parts of management tables 221 and 222 are transferred from scheduling module 22 to evaluating module 24. Alternatively, management tables 221 and 222 are shared by scheduling module 22 and evaluating module 24. Hereinafter, the access request management table will be termed the access request table, and the periodic job management table will be termed the periodic job table.

A write request Ro ("o" represents "original") that is transferred from scheduling module 22 to selecting module 23 includes an address of the memory region where the data is stored, the size of the data, and the time limit. When the disk device Do into which the data are to be written is designated, the request also includes the information of the designated disk device Do.

Data managing module 25 has data allocation table 252 for each file (for example, each stream data). Data allocation table 252 holds information indicating a storage location on disk devices 3 of each data item (for example a segment) belonging to the file. Also, data managing module 25 possesses data-moving reservation table 251 that holds information indicating which data are to be moved to another disk device 3 from the disk device 3 where the data are currently stored. If the size of data allocation table 252 and data-moving reservation table 251 gets large, it is possible to hold only part of these tables on control device 2, the complete tables being held on a storage device external to control device 2.

Figure 2:
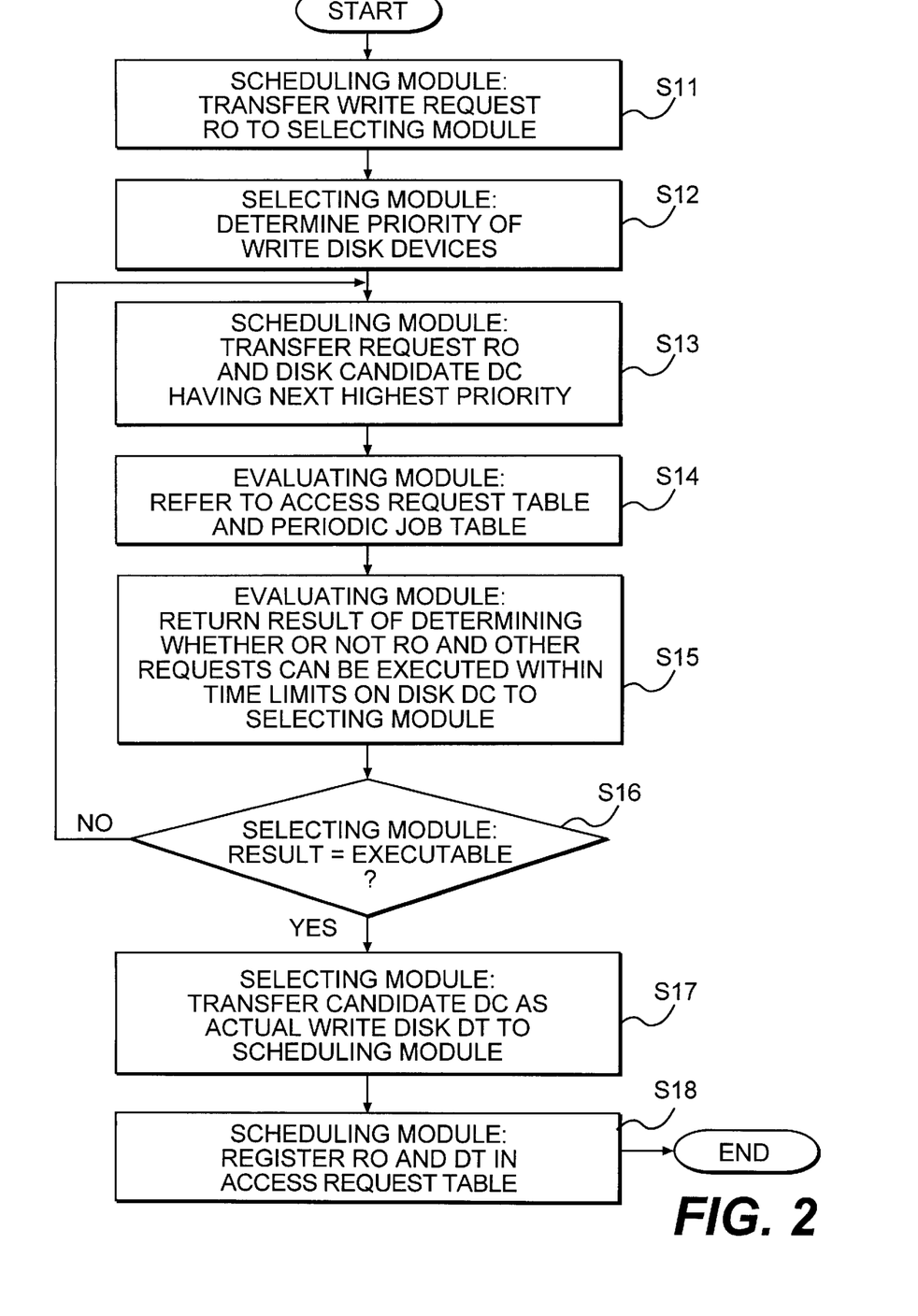
FIG. 2 is a flowchart showing an exemplary processing procedure for selecting a disk device into which data is to be written.

FIG. 2 is a flowchart showing an example of the processing sequence of control device 2 in this embodiment.

A write request is stored in a queue of a request receiving module (not shown) in control device 2. Then, scheduling module 22 reads out the write request and transfers it to selecting module 23 from scheduling module 22 in the form of a request Ro (step S11).

When selecting module 23 receives request Ro, it selects a disk device 3 having the highest priority as a write disk candidate Dc, in accordance with a selection priority order to be described below, and then transfers request Ro and information regarding write disk candidate Dc to evaluating module 24 (steps S12, S13). The information for write disk candidate Dc may include solely the disk device identifier.

Criteria for the priority order of selection of write disk candidates may include, alone or in combination:

(a) In a case where the disk device 3 to be written into is designated initially (e.g., request Ro includes the information of Do), such designated disk device 3 is prioritized in the selection process;

(b) A disk device 3 whose load is low is prioritized in the selection; or (c) A disk device 3 with a large amount of free space is prioritized in the selection.

It is also possible to adopt a random selection method without specifying any order of priority. Another alternative is to first employ criterion (a) referred to above and then, if no disk has been designated, to employ a random selection method.

Next, when request Ro and the information of disk device Dc is transferred from selecting module 23 to evaluating module 24, evaluating module 24 examines the schedule information of write disk candidate Dc (step S14). Specifically, evaluating module 24 inquires of scheduling module 22 about information regarding access requests currently issued to this disk device Dc (information from access request table 222) and information regarding access requests to be periodically issued (information of periodic job table 221), and scheduling module 22 then transfers these items of information to evaluating module 24. If access request table 222 and periodic job table 221 are shared, tables 221 and 222 may be directly referenced by evaluating module 24.

Next, evaluating module 24, under the assumption that request Ro is issued to disk device Dc, determines whether or not a new schedule can be compiled so that all the access requests including request Ro can be executed within their respective time limits. The result of this determination is returned to selecting module 23 (step S15). The method of determination depends on the scheduling method adopted by scheduling module 22.

Next, if a determination (evaluation) result returned from evaluating module 24 indicates that all the requests including Ro are schedulable, selecting module 23 selects write disk candidate Dc as disk device Dt to which the write request is actually issued, and returns the identifier of disk device Dt to scheduling module 22 (steps S16, S17). If a determination result to the effect that scheduling is not possible is returned, selecting module 23 takes disk device 3 which has the second highest (next highest) priority as write disk candidate Dc, and repeats the operation described above.

The foregoing method applies where selecting module 23 and evaluating module 24 selects and evaluates write disk candidates Dc one by one in the order of priority until they find an actual write disk Dt or find that no disk can accept request Ro. Alternatively, the following method may be adopted. First, evaluating module 24 evaluates all the disk devices 3 to find a group of disk devices 3 for which scheduling including request Ro is determined to be feasible. Then selecting module 23 selects, of this group, the disk device 3 having highest priority as disk device Dt to which the write request is to be actually issued, and returns the identifier of disk device Dt to scheduling module 22. Scheduling module 22 then registers request Ro and the identifier of disk device Dt in access request table 222 (step S 18). This completes the process of selecting module 23 and evaluating module 24 for one request Ro transferred from scheduling module 22.

Scheduling module 22 then issues access instructions to each disk device 3 in accordance with access request table 222. If the access instruction is a write instruction, scheduling module 22 adds an entry including the disk device identifier of Dt to which the write request is issued and the location (e.g., block number) on disk device Dt where the data is to be stored, to data allocation table 252 corresponding to the file of this data.

With this embodiment described above, even if the time of arrival of data received through a network departs from the anticipated time due to some external factor, causing accesses to be concentrated onto a specific disk at a given time, such write requests are dispersed onto other disk devices 3 that can afford time limits. Therefore, the data can be stored on disk devices 3 without either increasing the capacity of the buffer or losing received data.

In a case where the write disk device Do was originally designated by request Ro, but the operation described above results in that disk device Do and disk device Dt to which a write request was actually issued being different, it may be required to move the data subsequently from disk device Dt to the originally-intended write disk device Do. In such a case, first, when scheduling module 22 issues an instruction to disk devices 3 based on access request table 222, it registers, in addition to adding an entry for the written data in the data allocation table 252 as described above, a pointer indicating this entry and the original write disk Do in data-moving reservation table 251.

Figure 3:
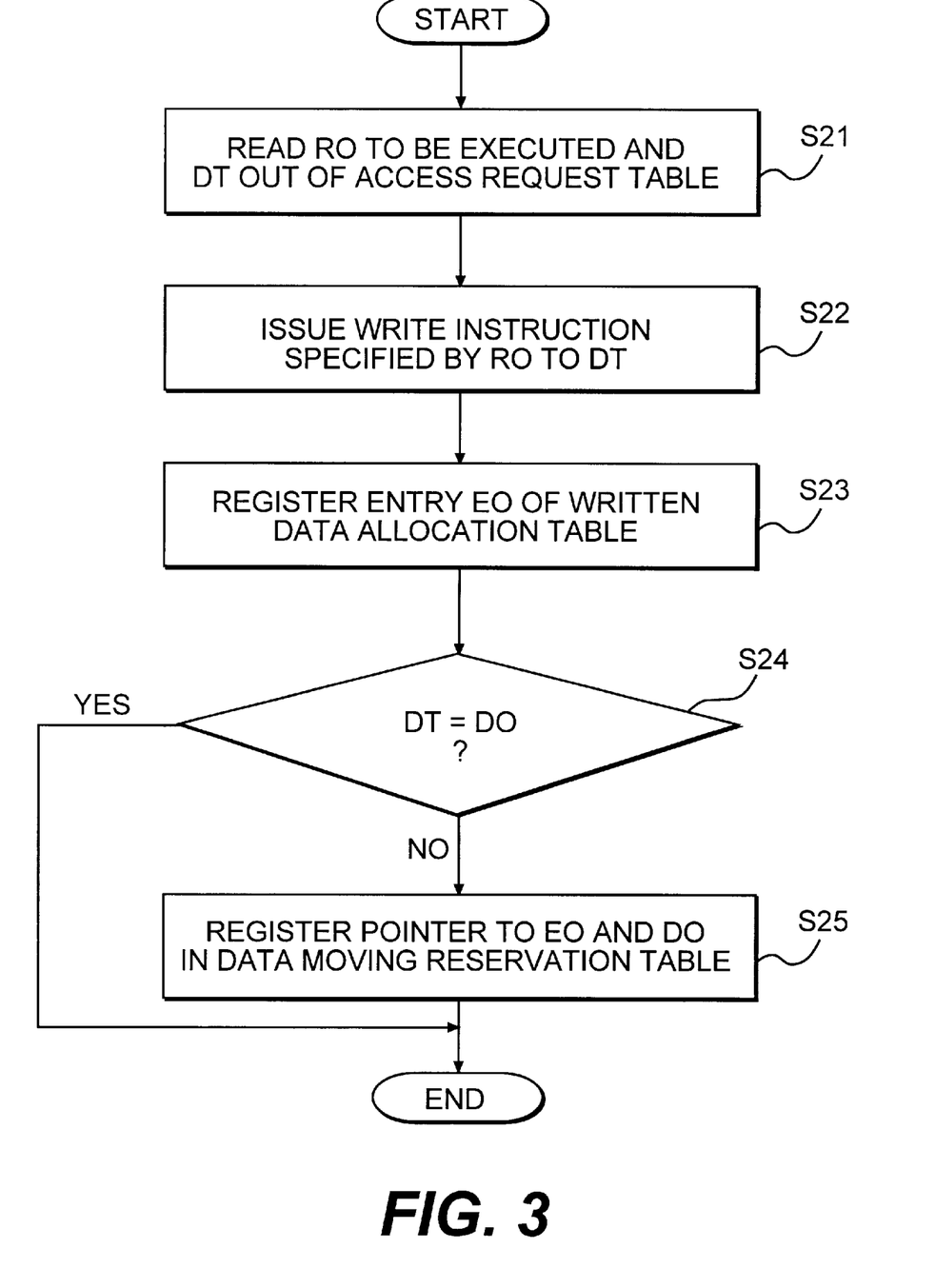
FIG. 3 is a flowchart showing an exemplary processing procedure for writing data into the selected disk device.

FIG. 3 shows a flowchart of this operation. Specifically, referring to access request table 222, scheduling module 22 reads out request Ro to be executed and the identifier of disk device Dt (step S21), and issues a write instruction specified by Ro to the disk device of identifier Dt (step S22), and furthermore registers an entry Eo for this data in data allocation table 252 (step S23). Then, if write disk device Dt and the originally-intended write disk device Do are different, a pointer to this entry Eo and the identifier Do are registered in data-moving reservation table 251 (steps S24, S25).

Subsequently, at a time when the load on the system has lightened, processing to move the data from disk device Dt where it was written to disk device Do where it should have been written is performed.

Figure 4:
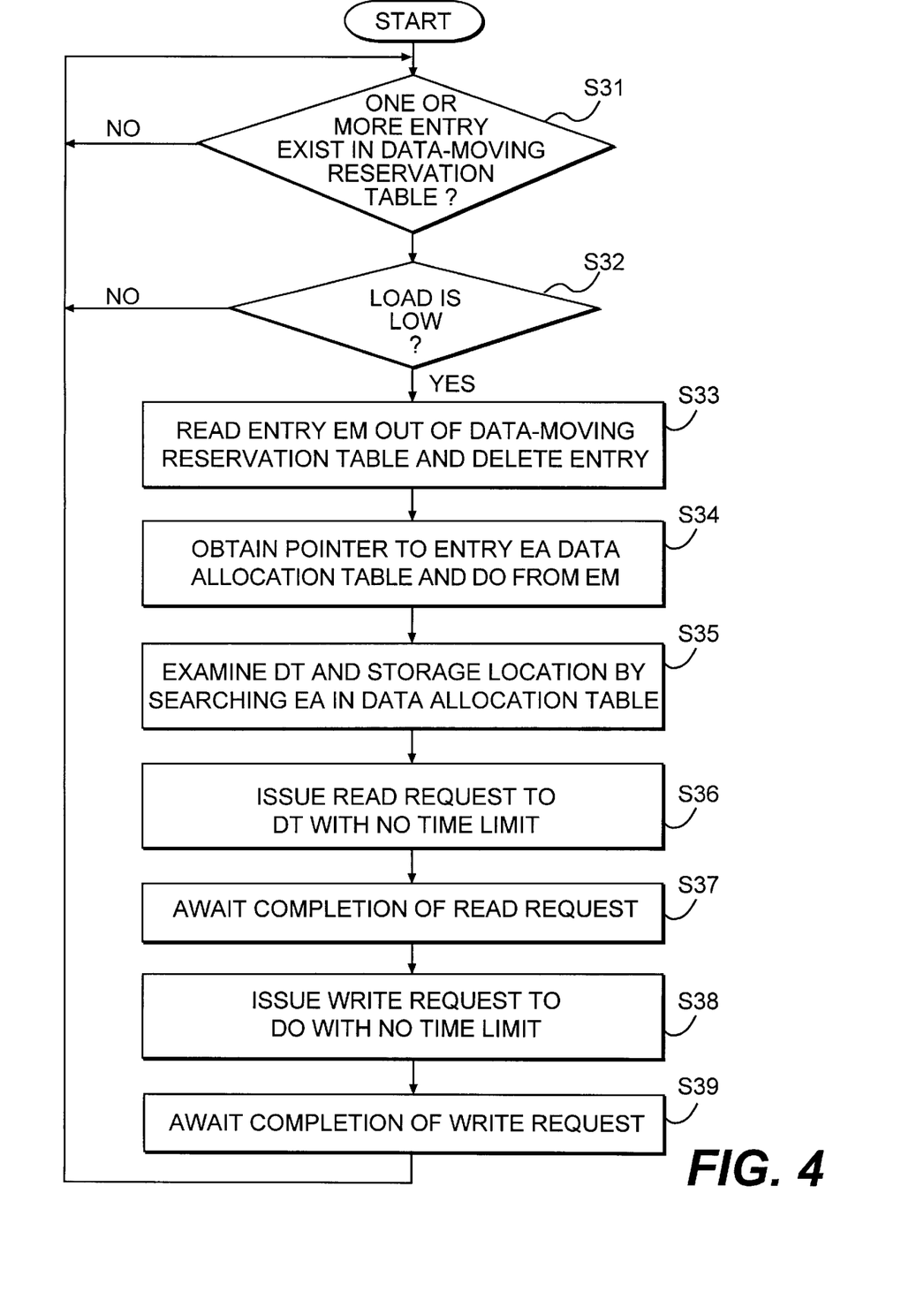
FIG. 4 is a flowchart showing an exemplary processing procedure for reallocating data in a disk device.

FIG. 4 is a flowchart showing an example of the procedure of this data reallocation processing. In outline, if an entry exists in data-moving reservation table 251 and a buffer region is available for storing the data read from disk device Dt (YES in steps S31 and S32), the data indicated by this entry is moved to the disk device 3 in which it should have been written (steps S33–S39).

This processing can be achieved by providing an execution unit or process for the processing of steps S31–S39. Alternatively, the system may provide a first execution unit or process for the processing of steps S31 and S32 and separately provide a second execution unit or process for the processing of steps S33–S39, the first one being arranged to activate the second one.

The data reallocation processing will now be described in more detail. Scheduling module 22 monitors data-moving reservation table 251 and the load regarding buffer regions with suitable timing. If an entry exists in data-moving reservation table 251 and resources such as buffer regions are available (YES in step S31, S32), the information of the entry is read out of data-movement reservation table 251 and this entry is deleted from the table (step S33). Using the information of the entry, data allocation table 252 is searched, to find the disk device Dt and the storage location on that disk where the data has been written (step S34, S35).

Then, scheduling module 22 issues a read request to read this data out of disk device Dt, without specifying a time limit, and awaits completion of the read request (steps S36, S37). After confirming the completion of executing the read request, scheduling module 22 issues a write request, designating Do as write disk device 3, without specifying a time limit (step S38), and awaits completion of the write request (step S39).

As shown in FIG. 3, the registration of an entry for Do in data allocation table 252 is performed when scheduling module 22 issues an instruction corresponding to the write request to disk device Do. After confirming that execution of the write request has been completed, scheduling module 22 deletes the data on disk Dt and the entry for Dt in data allocation table 252. With this embodiment, as described above, data can be re-allocated automatically onto disk device 3 that was originally designated by an external device or software, irrespective of how the data was stored when first received.

The following example concerns one embodiment of the invention where the data storage device of FIG. 1 is a video server. The configuration and operation of the video server in this example will first be described. A video server supplies a continuous video stream to a plurality of clients simultaneously. To supply a plurality of streams simultaneously, the stream data is divided into segments which are then stored on disk devices 3. Then, the stream data are read out in a time-division multiplexed manner. Furthermore, the video server schedules reservation of a buffer region for temporarily storing a segment, reading the segment out of disk device 3, writing the segment into the buffer region, and transferring the segment from the buffer region to a client, for each stream. The scheduling is performed to ensure that no breaks occur in any of the streams.

Figure 5A:
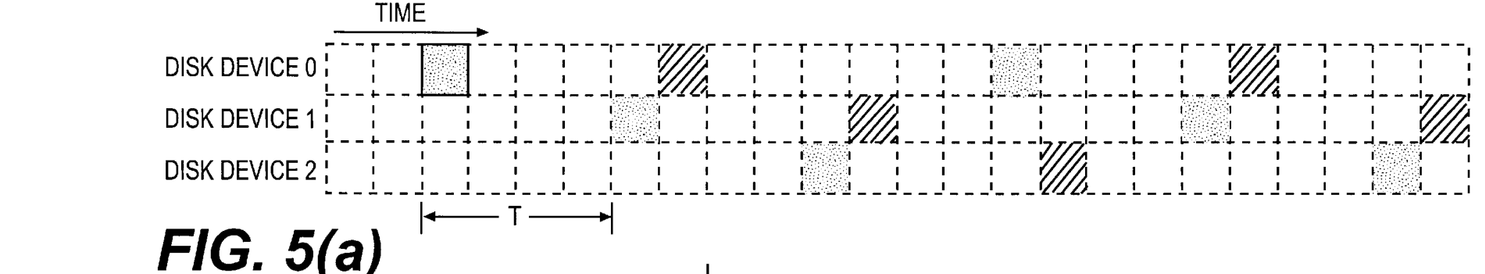
Figure 5B:
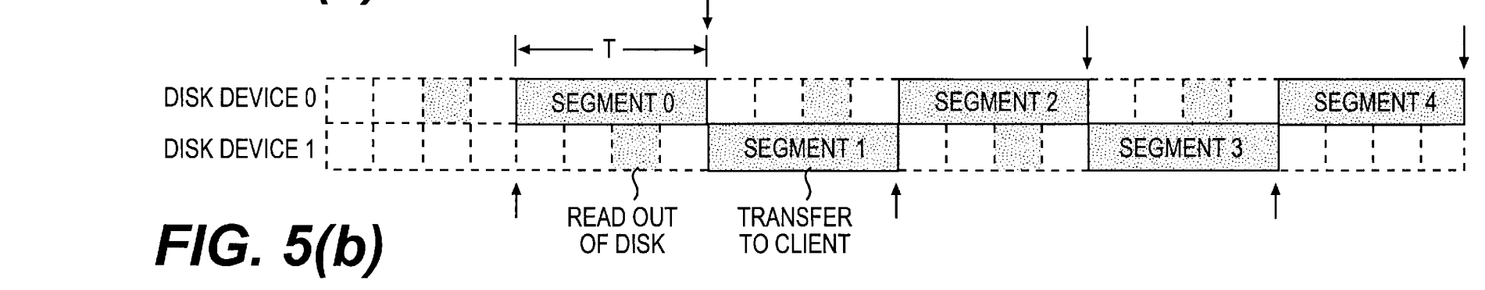
Figure 5C:
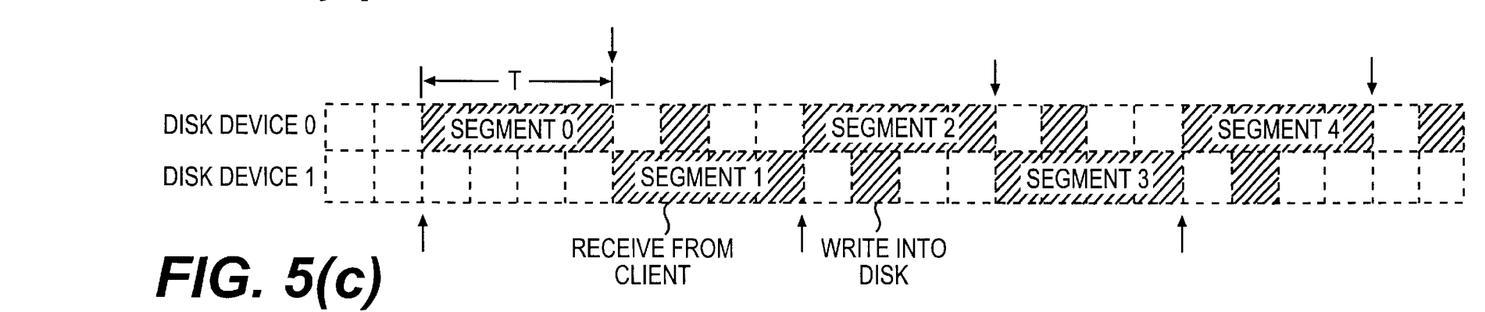

FIG. 5 shows an example of a time chart for data transfer in the video server. FIG. 5(a) is a time chart of disk access, FIG. 5(b) is a time chart of buffer use of a sending stream, and FIG. 5(c) is a time chart of buffer use of a receiving stream. In FIGS. 5(a)–(c), T represents the period and the arrows represent the timings of generation of access requests.

The stream data may be divided into segments of transfer time T, and are stored cyclically on the disk devices, such that the disk device identifiers of the segments are for example 0, 1, ..., N−1, 0, ... In FIG. 5, an example where N=3 is shown. Supply of each stream is effected by repetition of reading a segment and transferring the segment with period T. These operations are managed in fixed time intervals called time slots. One disk access is performed within one time slot and a plurality of time slots constitute period T. In one embodiment, a double buffer may be allocated in units of segment length for each stream.

Storage of an incoming data stream received from outside of the video server in real time is performed on disk devices 3 as follows. If the incoming data are accurately transferred with fixed rate, data segments are written with period T onto disk devices 0, 1, ..., N−1, 0, ..., sequentially, while the system forms one segment from the data received in time T. Thus, the received data can be stored without affecting other reading (sending) streams. For such writing (receiving) streams, a double buffer for each stream is preferably allocated. However, as described above, if the arrival of data is delayed (i.e., data of an amount corresponding to one segment does not arrive within period T) due to some external factor that cannot be predicted by the video server (e.g., delay in the network), scheduling as shown in FIG. 5 may be affected. The present invention helps.

The configuration of the video server in accordance with the principles of the present invention is essentially the same as has been described with reference to FIG. 1 through FIG. 4. The video server comprises a control device 2, memory device 4, a plurality of disk devices 3, and a network input/output device (not shown) are connected by a common bus. Control device 2 comprises a scheduling module 22, selecting module 23, evaluating module 24 and data managing module 25. The operation of these modules is also similar.

Periodic job table 221 in scheduling module 22 records information of the various streams and the time slots. Specifically, the information includes a status of each stream (e.g., whether it is a reading stream or a writing stream), information for identifying data to be read or written, an allocated memory region, a transfer destination (client), time slots in which disk access is to be performed, and time slots in which transfer is to be commenced, and so on. Using this information, it is predicted that operation will be performed with the timing shown in FIG. 5, and scheduling is effected so as to satisfy this time restriction.

Access request table 222 stores write requests for which data has arrived and are ready to be written and read requests for which a memory region has become available for being used. The access instruction that is actually sent to a disk device 3 in each time slot is issued by selecting one of the requests registered in access request table 222.

Data allocation table 252 in data managing module 25 stores, for each stream data, the disk device number where each segment is stored, the block number of each segment on the disk, and the size of each segment. Data-moving reservation table 251 stores, for segments that are written into a different disk device 3 than the originally designated write disk device 3, the stream data identifier, the segment number, and the identifier of the disk device into which the segment was originally intended to be written.

The operation of this video server is described below. First of all, writing of stream data is registered as a periodic job. When scheduling module 22 receives a registration request, it reserves a memory region and then registers a writing stream corresponding to the registration request in periodic job table 221. Also, scheduling module 22 prepares an entry for the new stream data in data allocation table 252. If allocation of a double buffer and allocation of a time slot are not possible, scheduling module 22 rejects the registration request because the memory capacity or disk device transfer capability is insufficient.

The data received by the network input/output device is held in the region on one side of the allocated double buffer. When the data reaches the size of one segment (transfer time T), scheduling module 22 issues a write request for the received data to a request receiving module (not shown) in control device 2. Concurrently, scheduling module 22 changes over the receiving buffer to another side of the double buffer. The write request includes information of buffer memory address, segment size, time limit, and write disk device 3. This time limit represents the restriction that the buffer memory must be released within period T to reserve memory for the next segment. The write disk devices 3 is designated in the order of disk device 0, 1, ..., N−1, 0, ...

When a request read out of the request receiving module is a write request, scheduling module 22 transfers this request Ro to selecting module 23 (step S11 of FIG. 2). Selecting module 23 selects, in accordance with the priority order, disk device 3 having the highest priority as write disk device candidate Dc, and transfers request Ro and the disk ID of write disk device candidate Dc to evaluating module 24 (step S12, S13). The priority order is determined as described previously.

Evaluating module 24 checks whether there is a free time slot within the upcoming time limit with respect to disk device Dc, by searching periodic job table 221 and access request table 222 in scheduling module 22. If there is such a free time slot, evaluating module 24 decides that scheduling is possible. If there is no such free time slot, it decides that scheduling is not possible. The result of the decision (evaluation) is returned to selecting module 23 (steps S14, S15). The way to perform this evaluation may be different, depending on the scheduling manner.

If the returned result of the decision is that scheduling is possible, selecting module 23 selects disk device Dc as actual write disk device Dt, and returns this disk device identifier to scheduling module 22. If the results of the decision is that scheduling is not possible, the disk device 3 having the next highest priority is taken as write disk device candidate Dc, and the above operation is repeated (steps S15, S16).

When the disk ID of Dt is returned from selecting module 23, scheduling module 22 registers the set of request Ro and disk ID of Dt in access request table 222 (step S17).

Selecting module 23 and evaluating module 24 may evaluate all the disk devices and then return to scheduling module 22 the identifier of disk device having the highest priority among the disk devices for which scheduling is decided to be possible, instead of repeating selection and evaluation for one disk device.

In the above, the operation up to registration of a write request in access request table 222 has been described. The write request is registered in accordance with the timing shown in the time charts of FIGS. 5 (a) and (c). In a case of a reading stream, a read request is registered in access request table 222 with the timing shown by the time charts of FIGS. 5 (a) and (b).

Using access request table 222, scheduling module 22 issues an instruction to be executed by each disk device 3 in each time slot. If the instruction is a write instruction, scheduling module 22 registers the segment number, the disk ID of Dt, the block number on the disk, and the segment size in data allocation table 252 for this stream data (steps S21–S25 of FIG. 3).

By the above operation, the stream data received from the network input/output device can be stored on disk devices 3 without loss of data. However, since there is no guarantee that the segments have been stored on disk devices 0, 1, ..., N−1, 0, ... in sequence, the stream data cannot be supplied with the timing shown in FIG. 5(b) without data re-allocation. Accordingly, when the load becomes lower so that a buffer region corresponding to one stream or more can be reserved, scheduling module 22 uses this buffer region to move segments between the disks.

First of all, when data is to be stored on disks 3, the necessary information is recorded in data-moving reservation table 25. Specifically, when an instruction to be executed by disk device 3 is issued from scheduling module 22, if the original write disk Do and write disk Dt selected by selecting module 23 are different, scheduling module 22 registers the set of the stream data identifier, segment number, and original write disk ID of Do in data-moving reservation table 251, concurrently with the sending of the write instruction to disk device 3. Based on this stream data identifier and segment number, an entry in the data allocation table 252 that records the storage location of the segment can be specified.

Then, in the condition that an entry is present in data-moving reservation table 251 and a buffer region is available, scheduling module 22 reallocates the data between the disk devices. Thereupon, scheduling module 22 checks for the presence of an entry in data-moving reservation table 251 and the reservation feasibility of a buffer region (corresponding to steps S31, S32 of FIG. 4) and, if the data is indeed to be reallocated, reserves the buffer region and generates a process for moving data (corresponding to steps S33–S39 of FIG. 4).

The process for moving data fetches information in one entry from data-moving reservation table 251 and then deletes this entry from the table. The fetched information includes the identifier of stream data to which the segment belongs, the segment number, and the original write disk device identifier of Do. The process then examines information in the entry indicated by the segment number in data allocation table 252 which indicates the storage locations of the data stream corresponding to the stream data identifier. The examined information includes disk device identifier Dt where the segment is stored, the block number where the segment is stored, and the segment size.

After the process confirms that the read request has been completed, it reserves a block on disk device Do for storing the segment. Then, the process generates a write request without specifying a time limit, but designating disk device Do, block number, segment size, and buffer region, and places the write request in the request waiting queue. Completion of executing the write request is then awaited. After confirming the completion of the write request, all the blocks on Dt where the segment was stored are released.

As described above, conventionally, when the write period was disturbed due to network delay etc., in the worst case, it was necessary to await the next free time slot for a time (N×T). In order to hold data in buffer memory during this time, it was necessary to provide buffer memory of an amount corresponding to (N+1) segments. However, by applying the present invention to a video server, allocation of a double buffer for each writing stream is sufficient even if the write period fluctuates. Thus, the total amount of memory can be reduced.

If a sufficient buffer region is available, it is possible to move a segment between disks in parallel with reception/sending of stream data which contains the segment. However, during the period where movement of segments between disks has still not yet been completed, there is no guarantee that sending of the data stream containing the segments can be executed without a break. Consequently, if a sending (reading) request for stream data which contains such segments arrives during the period in which movement of the segments between disks has not yet been fully completed, it is desirable to adopt one or other of the following policies:

(1) To notify the client that there is no guarantee of continuity, then to commence sending; or (2) To deny the sending request unless movement between disks has been fully completed.

Consequently, continuously issued write requests having time limits can be processed without loss of data and without affecting other disk access requests having time limits. Thus, the system can deal with the case where write requests with time limits are concentrated onto one of the disk devices, even without having a large amount of buffer memory.

In addition to those already mentioned above, persons of ordinary skill will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and sprit of the invention.

What is claimed is:

1. A data storage device, comprising:

a plurality of disk devices;

a module for storing a plurality of access requests for each of the plurality of disk devices;

a module for receiving a write request having a time limit;

a module for selecting one of the plurality of disk devices for the write request if it is determined that all of the access requests having time limits for the selected disk device and the write request can be executed within the respective time limits on the selected disk device; and a module for scheduling the plurality of access requests for the selected disk device and the write request and instructing the selected disk device to execute the scheduled access requests and write request.

2. The device according to claim 1, wherein the module for selecting further includes a submodule for selecting a disk device with a highest priority among the disk devices.

3. The device according to claim 2, wherein the module for selecting further includes a submodule for determining that a disk device designated in the write request has the highest priority, when the write request includes information designating the disk device.

4. The device according to claim 1, further comprising a module for reallocating data written on the selected disk device onto a disk device designated in the write request when the selected disk device is different from the designated disk device.

5. A data storage device, comprising:

a plurality of disk devices;

a module for storing a plurality of access requests for each of the plurality of disk devices;

a module for receiving a write request having a time limit and including information designating one of the plurality of disk devices; and a module for selecting a different one of the plurality of disk devices from the designated disk device for the write request when it is determined that some of the access requests having time limits for the designated disk device and the write request cannot be executed within the respective time limits on the designated disk device.

6. The device according claim 5, further comprising a module for scheduling the plurality of access requests for the selected disk device and the write request so that all of the access requests having time limits for the selected disk device and the write request are executed within the respective time limits, to instruct the selected disk device to execute the plurality of access requests and the write request.

7. The device according to claim 5, further comprising a module for reading out data written on the selected disk device and writing the read data onto the designated disk device after the write request is executed.

8. The device according to claim 7, wherein the module for reading and writing includes a module for determining a timing of the reading and a timing of the writing so as not to affect execution of all of the access requests having time limits within the respective time limits.

9. The device according to claim 5, wherein the module for selecting includes a module for selecting a disk device as the different disk device by giving a higher priority to a disk device having a lighter load.

10. The device according to claim 5, wherein the module for selecting includes a module for selecting a disk device as the different disk device by giving a higher priority to a disk device having more free memory capacity.

11. The device according to claim 5, wherein the module for selecting includes a module for selecting the different disk device at random among the plurality of disk devices.

12. A method of controlling a data storage device having a plurality of disk devices, comprising steps of:

storing a plurality of access requests for each of the plurality of disk devices;

receiving a write request having a time limit;

selecting one of the plurality of disk devices for the write request so that all of the access requests having time limits for the selected disk device and the write request are executed within the respective time limits on the selected disk device; and scheduling the plurality of access requests for the selected disk device and the write request to instruct the selected disk device to execute the scheduled access requests and write request.

13. The method according to claim 12, wherein the step of selecting includes a step of determining whether or not all the access requests having time limits for a given one of the plurality of disk devices and the write request can be executed within the respective time limits on the given disk device.

14. The method according to claim 12, wherein the step of selecting further includes a step of selecting a disk device with a highest priority among the disk devices determined affirmatively at the step of determining.

15. The method according to claim 14, wherein the step of selecting further includes a step of determining that a disk device designated in the write request has the highest priority, when the write request includes information for designating the disk device.

16. The method according to claim 12, further comprising a step of reallocating data written on the selected disk device onto a disk device designated in the write request, when the selected disk device is different from the designated disk device.

17. A method of controlling data storage device having a plurality of disk devices, comprising steps of:

storing a plurality of access requests for each of the plurality of disk devices;

receiving a write request having a time limit and including information for designating one of the plurality of disk devices;

selecting a different one of the plurality of disk devices from the designated disk device for the write request, when it is determined that some of the access requests having time limits for the designated disk device and the write request cannot be executed within the respective time limits on the designated disk device; and scheduling the plurality of access requests for the selected disk device and the write request so that all of the access requests having time limits for the selected disk device and the write request are executed within the respective time limits, to instruct the selected disk device to execute the plurality of access requests and the write request.

18. The method according claim 17, further comprising a step of storing a correspondence between the selected disk device and the designated disk device.

19. The method according to claim 17, further comprising a step of reading out data written on the selected disk device and writing the read data onto the designated disk device, after the write request is executed.

20. The method according to claim 19, wherein the step of reading and writing includes a step of determining a timing of the reading and a timing of the writing so as not to affect execution of all of the access requests having time limits within the respective time limits.

21. The method according to claim 17, wherein the step of selecting includes a step of selecting a disk device as the different disk device, by giving a higher priority to a disk device having a lower load.

22. The method according to claim 17, wherein the step of selecting includes a step of selecting a disk device as the different disk device, by giving a higher priority to a disk device having more free memory capacity.

23. The method according to claim 17, wherein the step of selecting includes a step of selecting the different disk device at random among the plurality of disk devices.

* * * * *